(12) United States Patent
Zinar et al.

(10) Patent No.: US 11,233,790 B2
(45) Date of Patent: Jan. 25, 2022

(54) NETWORK-BASED NT LAN MANAGER (NTLM) RELAY ATTACK DETECTION AND PREVENTION

(71) Applicant: CrowdStrike, Inc., Irvine, CA (US)

(72) Inventors: Yaron Zinar, Petah Tikva (IL); Marina Simakov, Ashdod (IL); Avraham Kama, Beer Yaakov (IL)

(73) Assignee: Crowd Strike, Inc., Irvine, CA (US)

( * ) Notice: Subject to any disclaimer, the term of this patent is extended or adjusted under 35 U.S.C. 154(b) by 135 days.

(21) Appl. No.: 16/795,140

(22) Filed: Feb. 19, 2020

(65) Prior Publication Data

US 2020/0274870 A1 Aug. 27, 2020

Related U.S. Application Data

(60) Provisional application No. 62/808,980, filed on Feb. 22, 2019.

(51) Int. Cl.
*H04L 29/06* (2006.01)
(52) U.S. Cl.
CPC ...... *H04L 63/0876* (2013.01); *H04L 63/0236* (2013.01); *H04L 63/0245* (2013.01); *H04L 63/20* (2013.01); *H04L 69/22* (2013.01)
(58) Field of Classification Search
CPC ............. H04L 63/0876; H04L 63/0236; H04L 63/0245; H04L 63/20; H04L 69/22
See application file for complete search history.

(56) References Cited

U.S. PATENT DOCUMENTS

| 10,909,536 | B2 * | 2/2021 | Givol | H04L 63/0876 |
| 2003/0009662 | A1 * | 1/2003 | Gindin | G06F 21/33 |
| | | | | 713/156 |
| 2004/0236962 | A1 * | 11/2004 | Wong | H04L 63/168 |
| | | | | 726/3 |
| 2008/0091954 | A1 * | 4/2008 | Morris | H04L 9/3236 |
| | | | | 713/187 |
| 2011/0320555 | A1 * | 12/2011 | Qiu | H04L 63/0892 |
| | | | | 709/207 |
| 2012/0198539 | A1 * | 8/2012 | Liu | H04L 63/0815 |
| | | | | 726/9 |
| 2014/0201517 | A1 * | 7/2014 | Corrion | H04W 12/06 |
| | | | | 713/155 |
| 2018/0098340 | A1 * | 4/2018 | Sashihara | H04W 72/042 |
| 2018/0176077 | A1 * | 6/2018 | Kanakarajan | H04L 9/3247 |
| 2020/0328886 | A1 * | 10/2020 | Newton | H04L 9/0869 |

* cited by examiner

*Primary Examiner* — Vance M Little
(74) *Attorney, Agent, or Firm* — Lee & Hayes, P.C.

(57) ABSTRACT

A method is provided for verifying an authentication request to a computer network. The method may include receiving a network packet and extracting an authentication request from the network packet. The authentication request may be encrypted to store attribute-value pairs, and the method may further include decrypting the authentication request to access the attribute-value pairs. The method may also include extracting a target name and a device name from the attribute-value pairs, wherein the device name indicates an identified target device, and determining whether the target name refers to the identified target device identified by the device name.

19 Claims, 6 Drawing Sheets

NETWORK-BASED NT LAN MANAGER (NTLM) RELAY ATTACK DETECTION AND PREVENTION

CROSS REFERENCE TO RELATED APPLICATIONS

The present application claims priority to U.S. Provisional Patent Application No. 62/808,980 filed on Feb. 22, 2019, the disclosure of which is incorporated herein by reference for all purposes.

BACKGROUND

Computers within computer networks may request access to other computers within the network and/or to a server on the network. For example, a server, such as an application server or a proxy server, or another computing device on the network may provide one or more services (e.g., application services, proxy services). Computers on the network may request access to the server in order to access the provided services.

However, to protect and restrict access to the provided services, access to the services is restricted to users with access permission. Computer networks rely on authentication protocols to verify user identities and enforce access permissions. These authentication protocols may be implemented by a server connected to the network and may process authentication requests prior to permitting access to services.

SUMMARY

The present disclosure presents new and innovative systems and methods for detecting relay attacks within a network. In one embodiment, a method is provided comprising receiving a network packet, extracting an authentication request from the network packet, wherein the authentication request is encrypted to store attribute-value pairs, and decrypting the authentication request to access the attribute-value pair. The method may also comprise extracting a target name and a device name of the authentication request from the attribute-value pairs, wherein the device name indicates an identified target device and determining whether the target name refers to the identified target device identified by the device name.

In another embodiment, the method further comprises determining that the target name does not refer to the identified target device and blocking the authentication request.

In yet another embodiment, the device name contains a unique name of the identified target device.

In a further embodiment, the target name includes an internet protocol (IP) address and determining whether the target name refers to the identified computing device further comprises identifying an assigned target device assigned to the IP address and determining whether the assigned target device matches the identified target device.

In a still further embodiment, the target name includes a service principal name (SPN). In such embodiments, determining whether the target name refers to the identified target device may further comprise mapping the SPN to a mapped target device and determining whether the mapped target device matches the identified target device.

In another embodiment, the authentication request is selected from the group consisting of a NETLOGON request according to a NETLOGON protocol and an authenticate response according to an NT LAN Manager (NTLM) protocol.

In yet another embodiment, the device name is an MsvAvComputerName for an NTLM protocol and the unique name is the NetBIOS computer name of the identified target device.

In a further embodiment, the target name is an MsvAvTargetName for an NTLM protocol.

In a still further embodiment, mapping the SPN to a mapped target device further comprises identifying the SPN in a database of SPN mappings. In such an embodiment, the database of SPN mappings may be created by monitoring traffic on a network.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Centralized authentication protocols, such as Windows® NT LAN Manager (NTLM) are susceptible to relay attacks from compromised servers on the network. For example, if a user attempts to connect to a malicious server compromised by an attacker, the attacker can capture the authentication request provided by the user. The malicious server may use the captured authentication request to connect to another computing device on the network. The captured authentication request can then be used to execute code on the other machine and may enable, e.g., user creation within a captured machine's active directory domain services, forging web requests, accessing databases, and otherwise bypassing the computer network's access permissions. The system and methods disclosed herein provide a way to intercept and prevent such malicious attempts to repurpose authentication requests.

Figure 1:
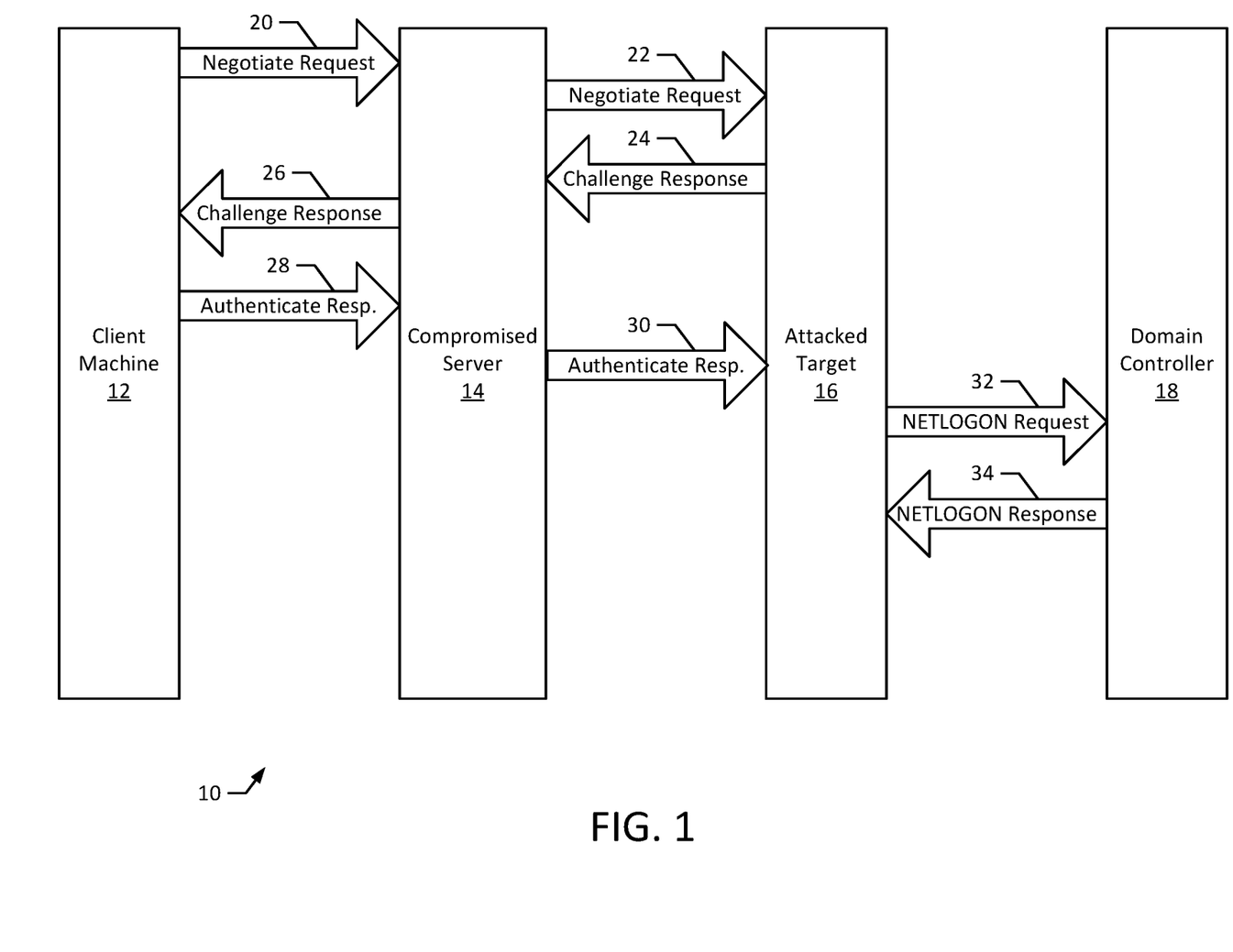
FIG. 1 illustrates the message flow associated with an attempted relay attack of the type addressed by the system of the present disclosure.

FIG. 1 depicts the message flow associated with an exemplary relay attack 10 for an NTLM authentication protocol. FIG. 1 includes a client machine 12, a compromised server 14, an attacked target 16, and a domain controller 18. The client machine 12 may be attempting to connect to a server on a network to access network services, such as network services provided by a server or another computing device on the network. The compromised server 14 may be compromised by malware or other software to intercept authentication requests from computing devices, such as the client machine 12, to gain access to another computing device on the network, such as the attacked target 16. The domain controller 18 may be implemented to perform centralized authentication for services on the network according to the NTLM and NETLOGON protocols. Further, as explained below, other devices on the network (e.g., the client machine 12, the compromised server 14, the attacked target 16) may exchange credentials via requests and responses according to the NTLM protocol and the domain controller 18 may authenticate the exchanged credentials according to the NETLOGON protocol.

The relay attack 10 begins with the client machine 12 transmitting a negotiate request (i.e., an NTLM negotiate request) to the compromised server 14 (block 20). The negotiate request may indicate that the client machine 12 is attempting to negotiate access to a network (e.g., by logging in with user credentials). In certain attacks, the client machine 12 may transmit the negotiation request without intervention from the compromised server 14 (e.g., at the request of a user using the client machine 12 or a client machine 12 computing process). In other versions of the attack, the compromised server 14 may prompt or otherwise cause the client machine 12 to transmit the negotiate request.

The compromised server 14 may then relay this negotiate request to the attacked target 16 (block 22). By relaying the negotiate request, the compromised server 14 may attempt to pass itself off as the client machine 12, using the negotiate request from the client machine 12 to gain access to the attacked target 16 (e.g., by intercepting and reusing the client machine's 12 responses under the NTLM protocol). The attacked target 16 may interpret the received negotiate request as a request from the client machine 12 to access one or more services provided by the attacked target 16.

Per the NTLM authentication protocol, the attacked target 16 may therefore respond with a challenge response (i.e., an NTLM challenge response) (block 24). The challenge response may be a random series of digits for encryption using a hash of a user password, later used by the domain controller 18 to authenticate provided user credentials. Similar to the negotiate request, the compromised server 14 may relay the challenge response to the client machine 12 (block 26). Because the client machine 12 initially transmitted the negotiated request to the compromised server 14, the client machine 12 may incorrectly interpret the received challenge response as coming from the compromised server 14.

In response, the client machine 12 may generate and transmit an authenticate response (i.e., an NTLM authenticate response) to the compromised server 14 based on the challenge response (block 28). According to the NTLM authentication protocol, the client machine 12 may encrypt the challenge response using a hash of a user credential (e.g., a password) to generate the authenticate response. The compromised server 14 may then relay the authenticate response to the attacked target 16 (block 30). Similar to the client machine 12, because the attacked target 16 provided the challenge response after receiving a negotiate request from the compromised server 14, the attacked target 16 may incorrectly interpret the authenticate response as being derived from user credentials associated with the compromised server 14.

The attacked target 16 may then generate a NETLOGON request including the authenticate response, challenge response, and other user credentials (e.g., user name) and may transmit the NETLOGON request to the domain controller 18 (block 32). The domain controller 18 may then compare the authenticate response and the challenge response to authenticate the user credentials. For example, the domain controller 18 may obtain the password hash associated with the provided user credentials and may use the password hash to encrypt the challenge response. If the encrypted challenge response created by the domain controller 18 and the authenticate response match, the domain controller 18 may authenticate the provided user credentials and approve the logon request. If there is no match, the domain controller 18 may determine that the provided user credentials are inauthentic and reject the logon request. Assuming the credentials provided by the client machine 12 are authentic, the authenticate response should match the encrypted challenge response generated by the domain controller 18, causing the domain controller 18 to authenticate the logon request even though the credentials did not originate with the compromised server 14.

The domain controller 18 may then generate a NETLOGON response indicating this determination and may transmit the NETLOGON response to the attacked target 16 (block 34). If the domain controller 18 approves the NETLOGON request, the NETLOGON response may indicate the approval. If the domain controller 18 rejects the NETLOGON request, the NETLOGON response may indicate the rejection. As described above, under the attack 10, the domain controller 18 will authenticate the NETLOGON request 32 if the underlying authenticate response was generated using authentic credentials at the client device 12. Therefore, the NETLOGON response received by the attacked target 16 will approve the NETLOGON request. Responsive to this, the attacked target 16 may then allow the compromised server 14 to access the attacked target's 16 services and directories, even though the compromised server 14 has not actually provided authenticated user credentials. After gaining access, the compromised server 14 may further undermine the security of the network by, e.g., adding users to the attacked target 16 active directory domain services, executing code on the attacked target 16, and utilizing the attacked target 16 network services without proper authorization or user credentials.

Also, although the attacked target 16 and the domain controller 18 are separate devices in FIG. 1, in certain versions of the attack 10, the domain controller 18 may be the attacked target. In such versions of the attack 10, the compromised server 14 may attempt to access one or more services of the domain controller 18 with user credentials provided at the client machine 12. To do so, the compromised server 14 may relay the authenticate response to the domain controller 18 at step 30. The domain controller 18 may then authenticate the authenticate request as discussed above and may grant access to the compromised server 14 if the relayed user credentials have permission to access the services of the domain controller 18.

A system and method for detecting and preventing such attacks is therefore required. Preferably, this system will operate at a central location within the network in conjunction with the network's authentication protocol to detect and reject logon requests and other packets that have been improperly relayed. Such a centralized implementation for relay attack monitoring may enable a system that is able to operate independent of the operating system of the devices generating and processing the negotiate request, challenge response, authenticate response, NETLOGON request, and NETLOGON response.

Figure 2:
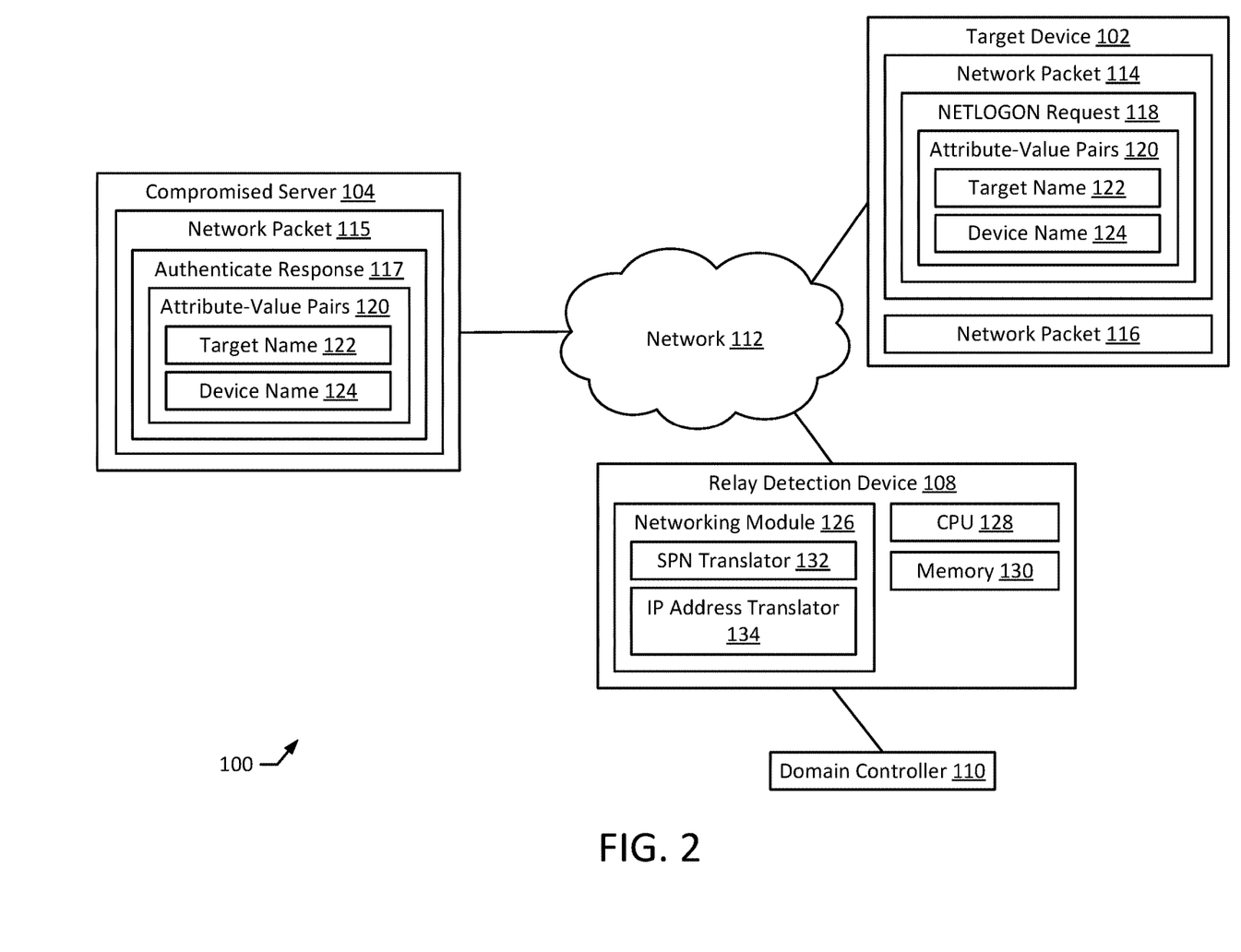
FIG. 2 illustrates a system according to an exemplary embodiment of the present disclosure.

FIG. 2 depicts a system 100 according to an exemplary embodiment of the present disclosure. As further explained above, the system 100 may be configured to provide centralized authentication services according to NTLM and NETLOGON protocols, and to detect and prevent relay attacks (e.g., the attack 10). The system 100 includes a target device 102 and a compromised server 104 connected to a network 112, which may respectively be examples of the attacked target 16 and the compromised server 14. A relay detection device 108 is also connected to the network 112, and a domain controller 110 is connected to the relay detection device 108. The domain controller 110 may be an example of the domain controller 18. The compromised server 104 generates and transmits network packets 115 containing an authenticate response 117 (i.e., an NTLM authenticate response) according to the NTLM protocol. The authenticate response 117 contains attribute-value pairs 120, which contains a target name 122 and a device name 124. The target device 102 generates and transmits network packets 114, 116 that, for example, contain a NETLOGON request 118 for authenticating user credentials according to the NETLOGON protocol. The NETLOGON request 118 contains the attribute-value pairs 120, which may include individual attribute value pairs such as the target name 122, and the device name 124 received in the authenticate response 117. According to the NTLM and NETLOGON protocols, the target name 122 may be implemented as the MsvAvTargetName contained within the attribute-value (AV) pairs of an NTLM authenticate response and the device name 124 may be implemented as the MsvAvNbComputerName contained within the AV pairs of an NTLM authenticate response.

The relay detection device 108 includes a networking module 126 containing a service principal name (SPN) translator 132 and an Internet protocol (IP) address translator 134. The relay detection device 108 also includes a CPU 128 and a memory 130.

The target device 102 may represent a device that provides one or more services to the network 112. The target device 102 may receive and process requests to authenticate user credentials from a computing device 104, 106 on the network 112.

The target device 102 may interact with the compromised server 104 according to the NTLM authentication protocol to exchange credentials (e.g., via NTLM negotiate requests, NTLM challenge responses, and NTLM authenticate responses). To verify the credentials provided via these interactions, the target device 102 may communicate with the domain controller 110 via the network 112 using a NETLOGON request 118 generated according to the NETLOGON protocol. In communicating with the domain controller 110, the target device 102 may generate one or more network packets 114, 116. For example, in validating an access request (e.g., an authenticate response 117) received from the compromised server 104, the target device 102 may generate a network packet 114 containing the NETLOGON request 118 for transmission to the domain controller 110. According to the NTLM and NETLOGON protocols, the target device 102 may generate the NETLOGON request 118 after exchanging NTLM negotiate requests, NTLM challenge responses, and NTLM authenticate responses with the compromised server 104, as explained above in connection with the attack 10.

As another example, the target device 102 may generate the NETLOGON request 118 to include the attribute-value pairs 120 of the authenticate response 117 received from the compromised server 104. According to such an example, and as depicted, both the authentication response 117 and the NETLOGON request 118 include attribute-value pairs 120 including a target name 122 and a device name 124.

The attribute-value pairs 120 permit the system to detect malicious relay attacks, such as the attack 10. The target names 122 may include the string provided in the original request (e.g., received in the negotiate request of an NTLM protocol) identifying the compromised server 104 as the device for which access is being requested by the NETLOGON request 118. For example, the target name 122 may include one or both of an IP address for the computing device to which access is granted or an SPN of a service for which the computing device is requesting access. In certain implementations, the target name 122 is signed by the user's hash (e.g., a hash based on the user's password). The attribute-value pairs 120 may also include a device name 124. The device name 124 may indicate a unique identifier (e.g., an IP address, a NetBIOS computer name) of the target device 102 for which access is requested by the NETLOGON request 118.

The relay detection device 108 may be configured to receive and process network packets 114, 116 received from the target device 102. For example, the relay detection device 108 may be configured to confirm the validity of NETLOGON requests 118 received within network packets 114 to ensure that authentication responses 117 captured and reused by malicious servers on the network 112 cannot be used to gain access to the target device 102 without permission. One or more of these functions may be implemented by the networking module 126. For example, one or more of these features may be implemented by the SPN translator 132 and the IP address translator 134.

Similarly, the relay detection device 108 may be configured to receive and process network packets 115 received from the compromised server 104. For example, the relay detection device 108 may receive a network packet 115 containing an authenticate response 117 if the compromised server 104 is requesting access to one or more network services provided by the domain controller 110. The relay detection device 108 may be configured to confirm the validity of authenticate responses 117 to ensure that authenticate responses 117 captured and reused by the compromised server 104 cannot be used to gain access to the domain controller 110 without permission. As with NETLOGON request 118 validation, one or more of the features may be implemented by the networking module 126, the SPN translator 132, and the IP address translator 134.

The SPN translator 132 may be configured to translate from an SPN (e.g., an SPN included as part of a target name 122) to a corresponding computing device. For example, the received SPN may refer to a service implemented by one or more computing devices (e.g., the attacked target 102 or the compromised server 104) of the network 112. The SPN translator 132 may be configured to convert from an SPN identifying a service to the computing device implementing the service identified by the SPN. For example, the SPN translator 132 may maintain a database that maps SPNs to corresponding computing devices (e.g., the compromised server 104 and the target device 102) on the network 112. The SPN translator 132 may update the entries of the databases based on data gathered from an active directory of the domain controller 110 and by monitoring traffic on the network 112. The SPN translator 132 may use this data to create new mappings between SPNs and computing devices for the database. The translated SPN may then be provided to the networking module 126 for subsequent verification of a NETLOGON request 118 or an authenticate response 117, as discussed below.

The IP address translator 134 may be configured to translate from an IP address (e.g., an IP address included as part of a target name 122 or a device name 124) to an identifier of a computer on the network 112. For example, the IP address translator 134 may translate the IP address using a DNS lookup, a NetBIOS request to the target machine (e.g., the NetBIOS name of the computing device 104, 106 at the provided IP address), or may analyze traffic (e.g., Kerberos traffic) within the network 112 that includes a device name along with the IP address. The translated IP address, or resulting device name, may be provided to the networking module 126 for subsequent verification of a NETLOGON request 118 or an authenticate response 117, as discussed below.

In one embodiment, the relay detection device 108 also includes a CPU 128 and the memory 130, which may be used to implement one or more features of the relay detection device 108. For example, the memory 130 may contain instructions which, when executed by the CPU 128, cause the CPU 128 to perform one or more functions of the relay detection device 108, such as the networking module 126, the SPN translator 132, and the IP address translator 134. In certain implementations, the relay detection device 108 may be implemented as a module (e.g., a software module) of a server on the network 112. For example, the relay detection device 108 may be implemented as a proxy server or a software module for the domain controller 110 of the network 112. As another example, the relay detection device 108 may be a software module within a server on the network 112 providing services to authorized computing devices.

The domain controller 110 may be configured to receive NETLOGON requests 118 and/or authenticate responses 117 and to verify the user credentials used to generate the NETLOGON requests 118. For example, similar to the above discussion of the attack 10 and the domain controller 18, the domain controller 110 may authenticate NETLOGON requests 118 by encrypting a challenge response of the NETLOGON request 118 with a password hash associated with user credentials of the authentication request and comparing the encrypted challenge response with an authenticate response of the NETLOGON request 118. If the encrypted challenge response and the authenticate response match, the domain controller 110 may determine that the provided user credentials are authentic. The domain controller 110 may similarly verify authenticate responses 117 received from a compromised server 104.

The network 112 may be implemented as one or more wired or wireless networks. For example, the network 112 may be implemented as the Internet or a local area network (LAN). The computing devices 102, 104, 106 and the relay detection device 108 may connect to the network 112 by wired or wireless means. For example, the client machines 102, 104, 106 and the relay detection device 108 may connect by one or more Ethernet, W-Fi, cellular, and/or Bluetooth connections.

Figure 3:
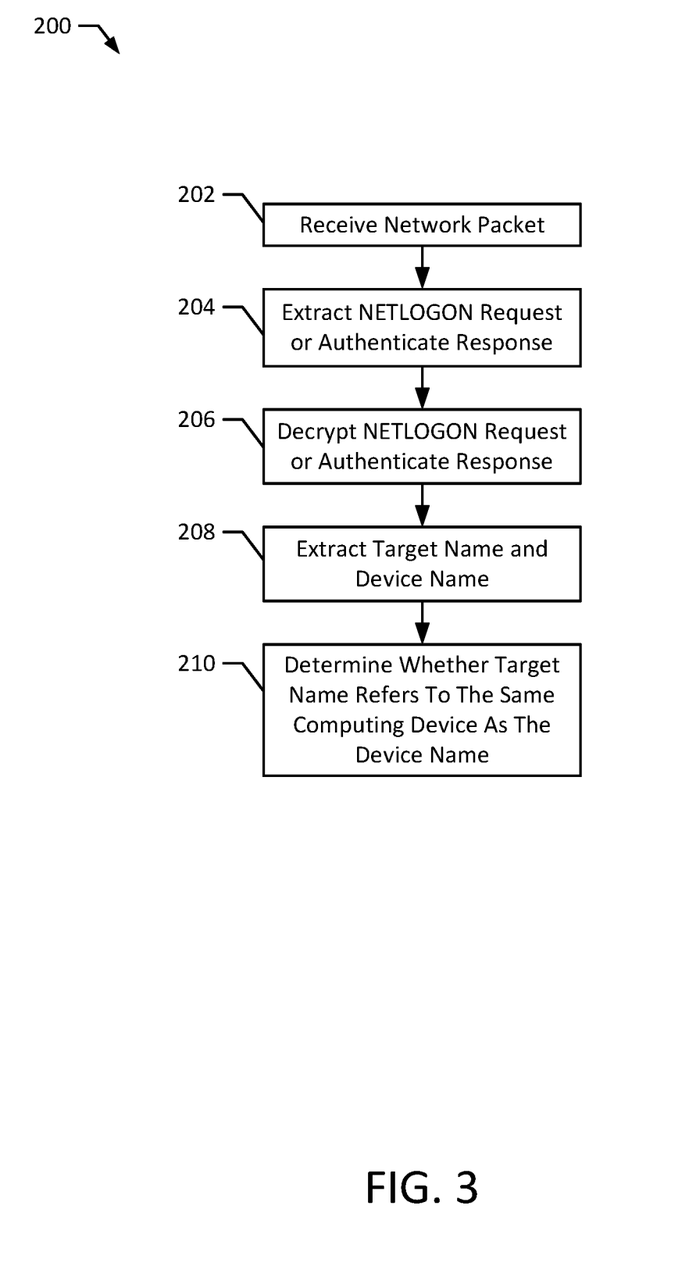
FIG. 3 illustrates a method according to an exemplary embodiment of the present disclosure.

FIG. 3 depicts a method 200 according to an exemplary embodiment of the present disclosure. The method 200 may be performed to verify the authenticity of a NETLOGON request 118 provided by a target device 102. For example, the method 200 may be performed by a relay detection device 108 and/or a networking module 126 when verifying a NETLOGON request 118 received via the network 112.

The method 200 may be implemented on a computer system, such as the relay detection device 108 and/or the domain controller 110. For example, the method 200 may be implemented by the networking module 126, the SPN translator 132, and the IP address translator 134. The method 200 may also be implemented by a set of instructions stored on a computer readable medium that, when executed by a processor, cause the computer system to perform the method. For example, all or part of the method 200 may be implemented by the CPU 128 and the memory 130. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 200 may begin with a relay detection device 108 receiving a network packet 114, 115, 116 (block 202). For example, the relay detection device 108 may receive a network packet 114, 116 from an attacked target device 102 via the network 112. The network packet 114, 116 may contain a NETLOGON request 118, an attribute value pairs 120, a target name 122, and a device name 124. As another example, the relay detection device 108 may receive a network packet 117 from a compromised server 104 via the network 112. The network packet 117 may contain an authenticate response 117 containing an attribute value pairs 120, a target name 122, and a device name 124. In certain implementations, the NETLOGON request 118 and/or the authenticate response 117 may be encrypted for secure storage and transmission.

The relay detection device 108 may then extract the NETLOGON request 118 or the authenticate response 117 (block 204). For example, the networking module 126 may extract the NETLOGON request 118 from the network packet 114 upon receipt of the network packet 114. As another example, the networking module 126 may extract the authenticate response 117 upon receipt of the network packet 115 if the compromised server 104 is requesting access to the domain controller 110.

The relay detection device 108 may then decrypt the NETLOGON request 118 or the authenticate response 117 (block 206). For example, the networking module 126 may decrypt the NETLOGON request 118 using a key retrieved from the domain controller 110. As another example, the networking module 126 may decrypt the authenticate response 117 using a private key of the compromised server 104.

After decrypting, the relay detection device 108 may then extract the target name 122 and device name 124 (block 208). For example, the target name 122 and device name 124 may be stored within attribute-value pairs 120 of the NETLOGON request 118 or the authenticate request 117. The relay detection device 108 and/or the networking module 126 may then extract the target name 122 and device name 124 from the attribute-value pairs 120.

The networking module 126 may then determine whether the target name 122 refers to the same device identified by the device name 124 (block 210). For example, the networking module 126, SPN translator 132, or IP address translator 134 may be used to identify a device on the network 112 corresponding to the target name 122. Similarly, the networking module 126, SPN translator 132, or IP address translator 124 may be used to identify the device corresponding to the device name 124. The networking module 126 may then determine whether the target name 122 refers to the same device identified by the device name 124, as explained further below.

Figure 4:
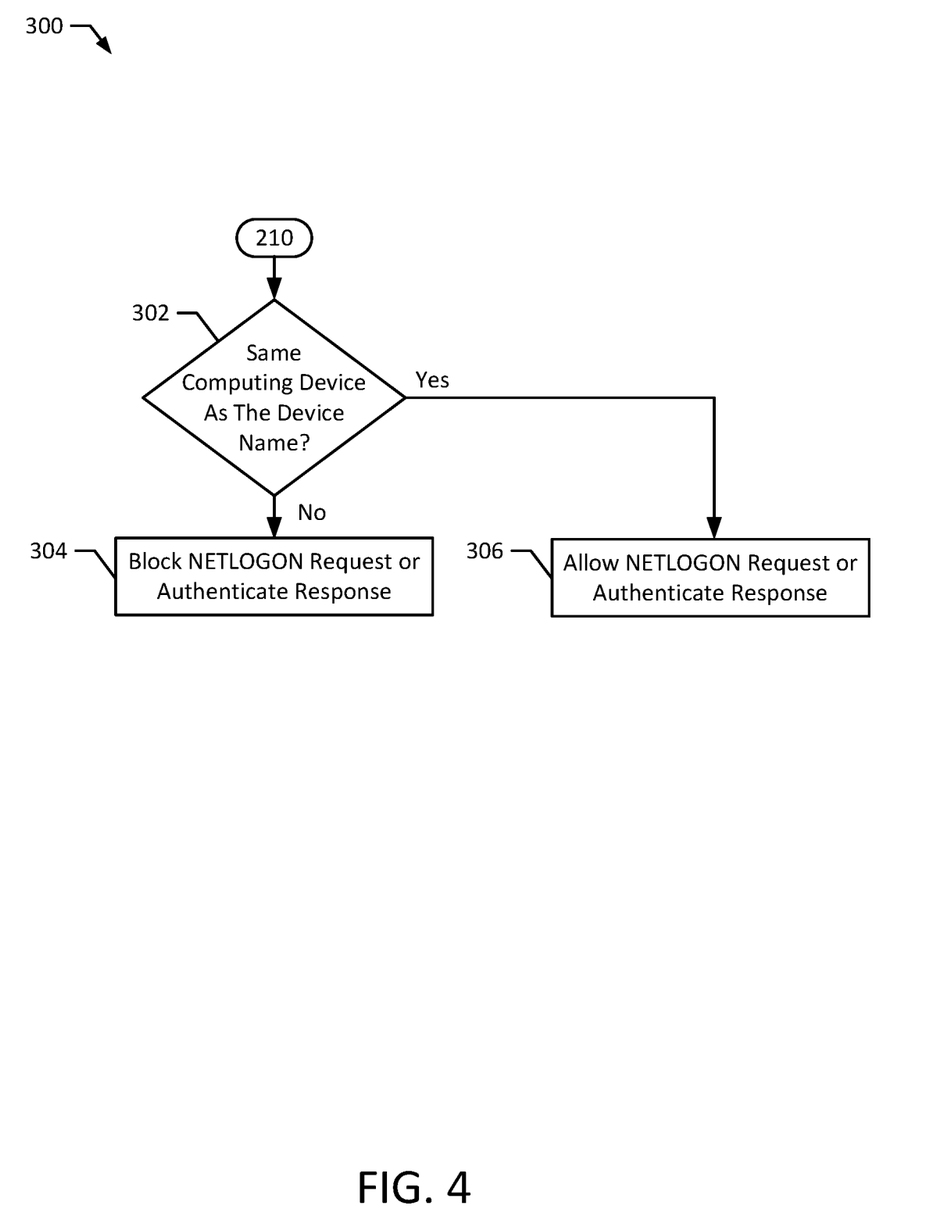
FIG. 4 illustrates a method according to an exemplary embodiment of the present disclosure.

FIG. 4 depicts a method 300 according to an exemplary embodiment of the present disclosure. The method 300 may be used to process a NETLOGON request 118 after evaluation by the networking module 126. For example, the method 300 may be performed to process a NETLOGON request 118 after the networking module 126 evaluates the NETLOGON request 118 according to the method 200. For example, the method 300 may be performed after block 210 of the method 200, as depicted.

The method 300 may be implemented on a computer system, such as the relay detection device 108 and/or the domain controller 110. For example, the method 300 may be implemented by the networking module 126. The method 300 may also be implemented by a set of instructions stored on a computer readable medium that, when executed by a processor, cause the computer system to perform the method. For example, all or part of the method 300 may be implemented by the CPU 128 and the memory 130. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The networking module 126 may first analyze whether the target name 122 refers to the target device 102 identified by the device name 124 (block 302). For example, block 302 may be performed responsive to the determination made at the block 210 of the method 200. If the networking module 126 determines that the target name 122 refers to the same target device 102 as the device name 124, the networking module 126 allows the NETLOGON request 118 or the authenticate response 117, depending on which was received (block 306).

If instead the networking module 126 determines that the target name 122 refers to a target device 102 different from the target device 102 identified by the device name 124, the networking module 126 blocks the NETLOGON request 118 or the authenticate response 117, depending on which was received (block 304). In implementations where the target name 122 is cryptographically signed with a user hash, a malicious computing device, such as a malicious server, may be unable to modify the target name 122 without undermining the cryptographic signature. The device name 124 may also be transmitted such that it cannot be modified without causing the domain controller 110 to reject the NETLOGON request 118 or the authenticate response 117. For example, the domain controller 110 may communicate with the target device 102 via a secure channel created with a cryptographic key associated with the target device 102 to receive the NETLOGON request 118. Similarly, the domain controller 110 may communicate with the compromised server 104 via a similarly-secured channel to receive the authenticate response 117. The domain controller 110 may be further configured to verify that the device name 124 matches the target device 102 or compromised server 104 that established the secure channel and may automatically reject NETLOGON requests 118 or authenticate responses 117 for which the device name 124 does not match. In addition to or instead of blocking the request, the networking module 126 may request a multi-factor authentication identifier from the user attempting to access the target device 102 and/or may issue an alert regarding the authenticate response 117 to, e.g., a network administrator or the user.

Therefore, if the target name 122 is determined to refer to a different target device 102 than the device name 124, this suggests that one or both of the target name 122 and the device name 124 have been modified by a malicious actor (e.g., a compromised server 12, 104 on the network 112). Therefore, authentication should not be allowed and the corresponding NETLOGON request 118 or authenticate response 117 is blocked.

Figure 5:
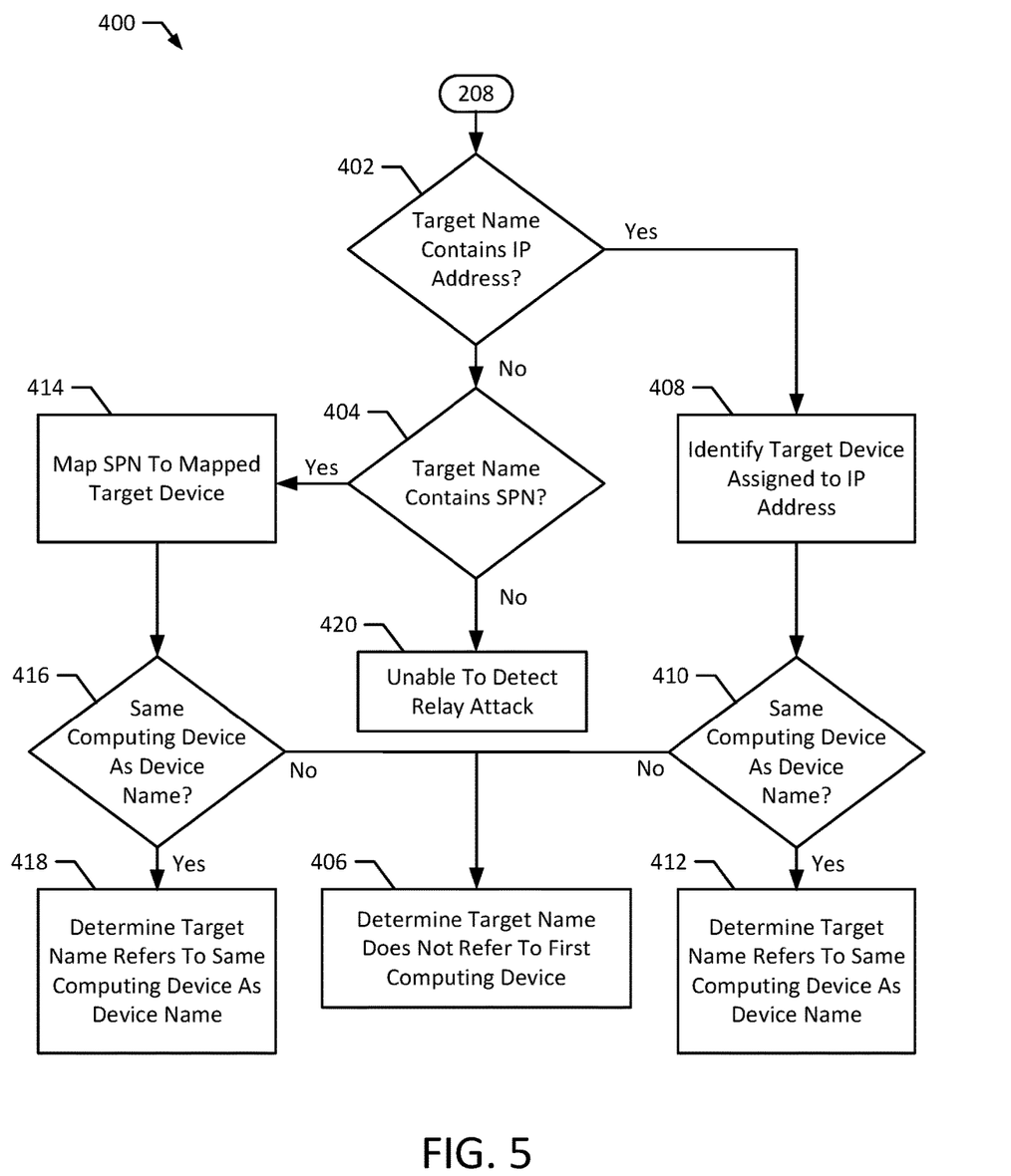
FIG. 5 illustrates a method according to an exemplary embodiment of the present disclosure.

FIG. 5 depicts a method 400 according to an exemplary embodiment of the present disclosure. The method 400 may be used to determine whether the target name 122 refers to the same target device 102 as the device name 124. For example, the networking model 126, SPN translator 132, and IP address translator 134 may perform the method 400 in implementing the block 210 of the method 200. Accordingly, as depicted, the method 400 may occur after the block 208 of the method 200.

The method 400 may be implemented on a computer system, such as the relay detection device 108 and/or the domain controller 110. For example, the method 400 may be implemented by the networking module 126, the SPN translator 132, and the IP address translator 134. The method 400 may also be implemented by a set of instructions stored on a computer readable medium that, when executed by a processor, cause the computer system to perform the method. For example, all or part of the method 400 may be implemented by the CPU 128 and the memory 130. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional. As another example, the relative ordering of the blocks 402, 404 may be switched.

The method 400 begins with the networking module 126 determining whether the target name 122 contains an IP address (block 402). As discussed above, in certain implementations, the target name 122 may contain the IP address for a target device 102 implementing a service for which access is requested. If the networking module 126 determines that the target name 122 contains an IP address, the networking module 126 may identify the target device 102 assigned to the IP address of the target name 122. For example, the IP translator 134 may translate the IP address of the target name 122 into an identifier (e.g., NetBIOS name, DNS name, Kerberos identifier) of the target device 102 assigned to the IP address of the target name 122.

The networking module 126 may then determine whether the assigned target device of the target name 122 is the same as the target device 102 identified by the device name 124 (block 410). The device name 124 may contain a unique identifier of a target device 102. The networking module 126 may determine if the unique identifier of the device name 124 refers to the assigned target device of the target name 122. For example, the IP address translator 134 may be configured to translate the IP address from the target name 122 into the same type of identifier as the unique identifier of the device name 124. For example, the device name 124 may contain the NetBIOS name of a target device 102. The IP address translator 134 may therefore be configured to translate the IP address of the target name 122 into a NetBIOS name. The networking module 126 at block 410 may then compare the NetBIOS name from the IP address translator 134 to the NetBIOS name of the device name 124. If the NetBIOS names from the IP address translator 134 and the device name 124 match, the networking module 126 may determine that the target name 122 and the device name 124 refer to the same target device 102.

If the networking module 126 determines that the IP address of the target name 122 refers to the same target device 102 as the device name 124 (block 412), processing may continue to, e.g., allowing the NETLOGON request 118 or authenticate response 117 to proceed (block 306). If the networking module 126 determines that the IP address of the target name does not refer to the same target device 102 is a device name 124 (block 406), processing may proceed to, e.g., blocking the authentication request the NETLOGON request 118 or authenticate response 117 from proceeding (block 304).

If the networking module 126 determines at block 402 that the target name 122 does not contain an IP address, the networking module 126 may then determine if the target name 122 contains an SPN (block 404). If the target name 122 contains an SPN, the SPN translator 132 may map the SPN of the target name 122 to a mapped target device. For example, as discussed above, the SPN translator 132 may map an SPN of a service for which access is requested by the NETLOGON request 118 to the associated target device 102 implementing the service. Similar to the IP address translator 134, the SPN translator 132 may be configured to translate the SPN into a unique identifier (e.g., NetBIOS name, DNS name, Kerberos identifier) of the target device 102.

The networking module 126 may then determine if the mapped target device 102 of the target name 122 is the same as the target device 102 identified by the device name 124 (block 416). Similar to the IP translator 134 at block 410, the SPN translator 132 may map the SPN into the same type of unique identifier used by the device name 124. For example, the SPN translator 132 may map the SPN into a NetBIOS name if the device name 124 stores the unique identifier as a NetBIOS name. The networking module 126 at block 416 may then compare the NetBIOS name from the SPN translator 132 to the NetBIOS name of the device name 124. If the NetBIOS names match, the networking module 126 may determine that the target name 122 and the device name 124 refer to the same target device 102.

If the networking module 126 determines that the SPN of the target name 122 refers to the same target device 102 as the device name 124 (block 412), processing may continue to, e.g., allowing the NETLOGON request 118 or authenticate response 117 to proceed (block 306). If the networking module 126 determines that the SPN of the target name 122 does not refer to the same target device 102 as a device name 124 (block 406), processing may proceed to, e.g., blocking the NETLOGON request 118 or authenticate response 117 from proceeding (block 304).

If the networking module 126 determines at block 404 that the target name does not contain an SPN or an IP address, the networking module 126 may determine that detecting a relay attack 10 is not possible (block 420). In such instances, processing may proceed to blocking the NETLOGON request 118 or authenticate response 117 in certain implementations (e.g., block 304). In other implementations, the networking module 126 may allow the NETLOGON request 118 or authenticate response 117 (e.g., block 306). In still further implementations, the networking module 126 may generate an alert or request a multi-factor authentication identifier from the user.

Figure 6:
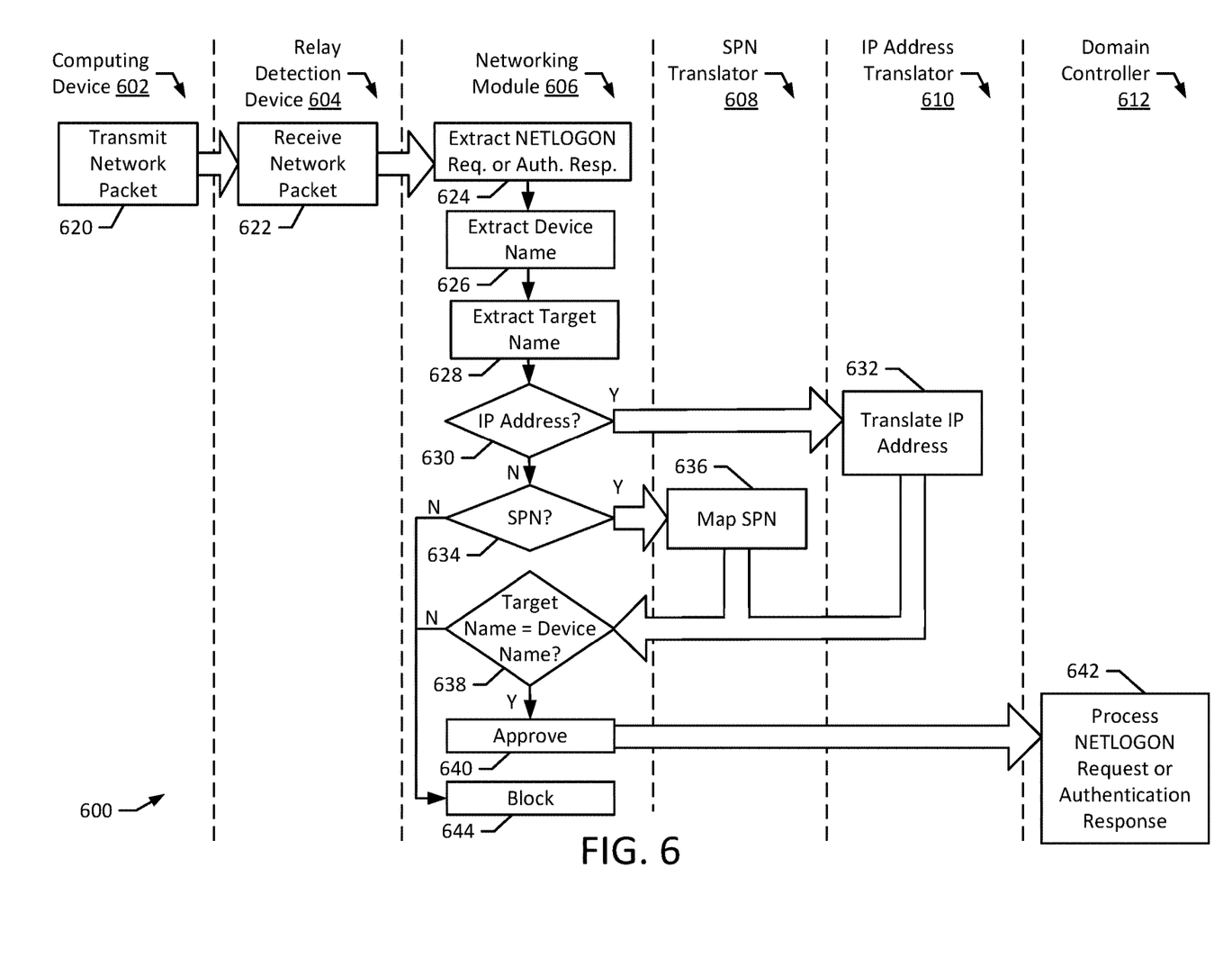
FIG. 6 illustrates a method according to an exemplary embodiment of the present disclosure.

FIG. 6 depicts a method 600 according to an exemplary embodiment of the present disclosure. The method 600 may be performed to verify the authenticity of a NETLOGON request 118 received from a target device 102 or an authenticate response 117 received from a compromised server 104. For example, the method 600 may be performed by the system 100, including the relay detection device 108, networking module 126 and/or the domain controller 110 when verifying a NETLOGON request 118 or an authenticate response 117 received via the network 112.

The method 600 may also be implemented by a set of instructions stored on a computer readable medium that, when executed by a processor, cause the computer system to perform the method. For example, all or part of the method 600 may be implemented by the CPU 128 and the memory 130. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 includes a computing device 602, which may be an implementation of the target device 102 and/or the compromised server 104, and a relay detection device 604, which may be an implementation of the relay detection device 108. The relay detection device 604 also includes a networking module 606, which may be an implementation of the networking module 126, and which includes an SPN translator 608 and an IP address translator 610, which may be implementations of the SPN translator 132 and the IP address translator 134. The method 600 further includes a domain controller 612, which may be an example implementation of the domain controller 110 and may, in certain implementations, implement one or more of the relay detection device 604, the networking module 606, the SPN translator 608, and the IP address translator 610.

The method 600 begins with the computing device 602 transmitting a network packet 114, 115, 116 (block 620). In certain examples, the computing device 602 (e.g., the target device 102) may generate the network packet 114 to include a NETLOGON request 118 in response to receiving an authenticate response 117 from a compromised server 104 while authenticating user credentials provided by a different computing device requesting access to services provided by the computing device 602. In other examples, the computing device 602 (e.g., the compromised server 104) may generate the network packet 115 to include an authenticate response 117 while requesting access to services provided by the domain controller 612. The relay detection device 604 may then receive the network packet 114, 115, 116 and may send the network packet 114, 115, 116 to the networking module 606 (block 622).

The networking module 606 may then extract the NETLOGON request 118 or the authenticate response 116 from the network packet 114, 115, 116 (block 624). As described above, the networking module 606 may decrypt the network packet 114, 115, 116 prior to extracting the NETLOGON request 118 or the authenticate response 117. The networking module 606 may then extract a device name 124 and target name 122 from the NETLOGON request 118 or the authenticate response 117 (e.g., from an attribute-value pairs 120 of the NETLOGON request 118 or the authenticate response 117) (blocks 626, 628).

The networking module 606 may then analyze the target name 122 to determine whether the target name 122 contains and IP address or an SPN (block 630, 634). If the networking module 606 determines that the target name 122 contains an IP address, the networking module 606 may send the target name 122 to the IP address translator 610. The IP address translator 610 may then translate the IP address (block 632). For example, the IP address translator 610 may identify an assigned device assigned to the IP address of the target name 122 (e.g., the NetBIOS name of the target device assigned to the IP address). If the networking module 606 instead determines that the target name 122 contains an SPN, the networking module 606 may send the target name 122 to the SPN translator 608. The SPN translator 608 may then map the SPN (block 636). For example, the SPN translator 608 may map the SPN of the target name 122 to a mapped device associated with the SPN (e.g., the NetBIOS name of the target device assigned to the SPN).

After processing at either or both of blocks 632, 636 is complete, the SPN translator 608 and IP address translator 610 may return the mapped device or assigned device to the networking module 606. The networking module 606 may then determine whether the target name 122 refers to the same target device as the device name 124 (block 638). For example, the SPN translator 608 and/or the IP address translator 610 may be configured to map and/or translate the target name 122 into the same format used by the device name 124 (e.g., a NetBIOS name). If the mapped or translated target name 122 refers to the same device as the device name 124, the networking module 606 may determine that the target name 122 and the device name 124 refer to the same computing device 602.

If the target name 122 and the device name 124 refer to the same computing device 602, the networking module 606 may approve the NETLOGON request 118 or the authenticate response 117 (block 640) and may forward the NETLOGON request 118 or the authenticate response 117 to the domain controller 612 for further processing (block 642). If, instead, the target name 122 and the device name 124 do not refer to the same computing device 602, the networking module 606 may block the NETLOGON request 118 or the authenticate response 117 (block 644) and processing may stop. Similarly, if the NETLOGON request 118 or the authenticate response 117 includes neither an IP address nor an SPN, the networking module 606 may block the NETLOGON request 118 or the authenticate response 117 (block 644). In certain implementations, rather than blocking the NETLOGON request 118 or the authenticate response 117 at block 644, the networking module 606 may request a multi-factor authentication identifier from the user attempting to access the target device 102 and/or may issue an alert regarding the NETLOGON request 118 or the authenticate response 117 to, e.g., a network administrator or the user. In such implementations, the networking module's response at block 644 may be configurable by, e.g., a user.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
 receiving a network packet;
 extracting an authentication request from the network packet, wherein the authentication request is encrypted to store attribute-value pairs;
 decrypting the authentication request to access the attribute-value pairs;
 extracting a target name and a device name of the authentication request from the attribute-value pairs, wherein the device name indicates an identified target device; and
 determining whether the target name refers to the identified target device identified by the device name.

2. The method of claim 1, further comprising:
 determining that the target name does not refer to the identified target device; and
 blocking the authentication request.

3. The method of claim 1, wherein the device name contains a unique name of the identified target device.

4. The method of claim 1, wherein the target name includes an internet protocol (IP) address, and wherein determining whether the target name refers to the identified target device further comprises:
 identifying an assigned target device assigned to the IP address; and
 determining whether the assigned target device matches the identified target device.

5. The method of claim 1, wherein the target name includes a service principal name (SPN), and wherein determining whether the target name refers to the identified target device further comprises:
 mapping the SPN to a mapped target device; and
 determining whether the mapped target device matches the identified target device.

6. The method of claim 5, wherein mapping the SPN to a mapped target device further comprises identifying the SPN in a database of SPN mappings, and wherein the database of SPN mappings is created by monitoring traffic on a network.

7. The method of claim 1, wherein the authentication request is selected from the group consisting of a NETLOGON request according to a NETLOGON protocol and an authenticate response according to an NT LAN Manager (NTLM) protocol.

8. The method of claim 3, wherein the device name is an MsvAvComputerName for an NTLM protocol and the unique name is a NetBIOS computer name of the identified target device.

9. The method of claim 7, wherein the target name is an MsvAvTargetName for an NTLM protocol.

10. A system comprising:
 a processor; and
 a memory storing instructions which, when executed by the processor, cause the processor to:
 receive a network packet;
 extract an authentication request from the network packet, wherein the authentication request is encrypted to store attribute-value pairs;
 decrypt the authentication request to access the attribute-value pairs;
 extract a target name and a device name of the authentication request from the attribute-value pairs, wherein the device name indicates an identified target device; and
 determine whether the target name refers to the identified target device identified by the device name.

11. The system of claim 10, wherein the memory stores further instructions which, when executed by the processor, cause the processor to:
  determine that the target name does not refer to the identified target device; and
  block the authentication request.

12. The system of claim 10, wherein the device name contains a unique name of the identified target device.

13. The system of claim 10, wherein the target name includes an internet protocol (IP) address, and wherein the memory stores further instructions which, when executed by the processor while determining whether the target name refers to the identified target device, cause the processor to:
  identify an assigned target device assigned to the IP address; and
  determine whether the assigned target device matches the identified target device.

14. The system of claim 10, wherein the target name includes a service principal name (SPN), and wherein the memory stores further instructions which, when executed by the processor while determining whether the target name refers to the identified target device, cause the processor to:
  map the SPN to a mapped target device; and
  determine whether the mapped target device matches the identified target device.

15. The system of claim 14, wherein mapping the SPN to a mapped target device further comprises identifying the SPN in a database of SPN mappings, and wherein the database of SPN mappings is created by monitoring traffic on a network.

16. The system of claim 10, wherein the authentication request is selected from the group consisting of a NETLOGON request according to a NETLOGON protocol and an authenticate response according to an NT LAN Manager (NTLM) protocol.

17. The system of claim 12, wherein the device name is an MsvAvComputerName for an NTLM protocol and the unique name is a NetBIOS computer name of the identified target device.

18. The system of claim 16, wherein the target name is an MsvAvTargetName for an NTLM protocol.

19. A non-transitory, computer-readable medium storing instructions which, when executed by a processor, cause the processor to:
  receive a network packet;
  extract an authentication request from the network packet, wherein the authentication request is encrypted to store attribute-value pairs;
  decrypt the authentication request to access the attribute-value pairs;
  extract a target name and a device name of the authentication request from the attribute-value pairs, wherein the device name indicates an identified target device; and
  determine whether the target name refers to the identified target device identified by the device name.

* * * * *